(12) United States Patent
Takano et al.

(10) Patent No.: US 6,186,289 B1
(45) Date of Patent: Feb. 13, 2001

(54) DISC BRAKE

(75) Inventors: Atsushi Takano, Tokyo; Youichi Kumemura, Kanagawa-ken; Hideaki Ishii, Yamanashi-ken, all of (JP)

(73) Assignee: Tokico Ltd., Kanagawa-ken (JP)

( * ) Notice: Under 35 U.S.C. 154(b), the term of this patent shall be extended for 0 days.

(21) Appl. No.: 09/272,208

(22) Filed: Mar. 19, 1999

(30) Foreign Application Priority Data

Mar. 31, 1998 (JP) .................................................. 10-087753

(51) Int. Cl.[7] .................................................. F16D 65/095
(52) U.S. Cl. .................................. 188/73.39; 188/205 R; 188/73.35
(58) Field of Search ................................ 188/73.39, 71.1, 188/205 R, 205 A, 206 A, 206 R, 218 A, 73.35, 73.36, 73.31, 73.47

(56) References Cited

U.S. PATENT DOCUMENTS 4,047,598 * 9/1977 Thrower ........................... 188/205 R
5,564,532 * 10/1996 Baba et al. ......................... 188/73.39
5,566,791 * 10/1996 Ohishi ............................... 188/73.39

FOREIGN PATENT DOCUMENTS 7-259901    10/1995   (JP) .

* cited by examiner

Primary Examiner—Douglas C. Butler
(74) Attorney, Agent, or Firm—Wenderoth, Lind & Ponack, L. L. P.

(57) ABSTRACT

A disc brake includes a carrier with an inner beam secured to a knuckle, a pair of in board and outboard brake pad assemblies located on opposite sides of a rotor and slideably supported on the carrier, and a caliper extending over the periphery of the rotor and axially moved to urge the in board and outboard brake pad assemblies into frictional engagement with the opposite sides of the rotor. The carrier is constructed so that the difference in natural frequency between a bending mode and a torsion mode is at least 300 Hz. The carrier has a moment of inertia of area/polar moment of inertia of area ratio of at least 0.75.

16 Claims, 7 Drawing Sheets

DISC BRAKE

BACKGROUND OF THE INVENTION

The present invention relates to disc brakes for use on automotive vehicles.

A known disc brake for a motor vehicle typically includes a pair of in board and outboard brake shoes or pad assemblies placed on opposite sides of a rotor rotatable with a wheel to be braked and slideably supported on a carrier secured to a non-rotatable part of the vehicle. When a brake pedal is depressed, a caliper is moved on the carrier to urge the in board and outboard pad assemblies into frictional engagement with opposite sides of the rotor so as to apply the necessary clamping force thereto.

A problem associated with such a conventional disc brake is the frequent occurrence of a low frequency noise or squeal when the pad assemblies are pressed against the rotor. Such a noise is obviously uncomfortable to the driver. There is thus a need to substantially reduce the number of occurrences of such a low frequency noise.

An attempt has been made to reinforce the most deformed part of a carrier to increase its rigidity, as disclosed in Japanese laid-open patent publication No. 7-259901. This attempt is effective in reducing the extent of vibrations, but fails to reduce the number of occurrences of a low frequency noise (see FIG. 7).

Through an extensive search, the inventor has found that the occurrence of a low frequency noise of, for example, 1.8 kHz, is more closely related to vibrations of a carrier than to any other part of a disc brake. The carrier has various modes of vibration such as bending and torsion modes of vibration. The carrier typically includes a pair of inner arms located on the in board side of a rotor and having a pair of guides along which an in board brake pad assembly is axially moved, a pair of outer arms located on the outboard side of the rotor and having a pair of guides through which an outboard brake pad assembly is axially moved, an inner beam extending between the two inner arms and secured to a knuckle or other fixed part of a vehicle, and an outer beam extending between the two outer arms. In the torsion mode, the inner arms are twisted in opposite directions. This is also the case with the outer arms. In the bending mode, the inner and outer arms are bent about an axis parallel to the axis of the rotor. It has been found that these two different modes of vibration interact to cause a self-exited vibration and thus, a low frequency squeal.

In the disc brake shown in Japanese laid-open patent publication No. 7-259901, the difference in natural frequency between the bending and torsion modes is even less than that of the typical carrier known in the art (see FIG. 7). It is believed that an increase in rigidity of the carrier does not bring about a reduction in the number of occurrences of the low frequency noise.

Accordingly, it is an object of the present invention to provide a disc brake which enables a substantial reduction in the number of occurrences of a low frequency noise or squeal without the need for additional parts and without increasing its production cost and weight.

SUMMARY OF THE INVENTION

To achieve the foregoing object, the present invention provides an improved disc brake comprising a carrier adapted to be secured to a fixed part of a vehicle, such as a knuckle, a pair of in board and outboard pad assemblies located on opposite sides of a disc or rotor rotatable with a wheel to be braked, and a caliper extending over the periphery of the rotor and axially moved to urge the in board and outboard pad assemblies into frictional engagement with opposite sides of the rotor. As a feature, the carrier is constructed such that the difference between the natural frequency in a bending mode and that in a torsion mode is at least 300 Hz. This large difference in natural frequency between the two modes of vibration can avoid undesirable interaction therebetween and thus, eliminate the occurrence of a low frequency noise.

In a preferred embodiment, the carrier includes an inner beam secured to the fixed part of the vehicle and an outer beam connected to the inner beam in an axially spaced relation. The inner beam has a moment of inertia of area when bent and a polar moment of inertia of area when twisted. The inner beam has a moment of inertia of area/polar moment of inertia of area ratio of at least 0.75. In this design, the inner beam is twisted as much as a typical inner beam known in the art, but better resists bending stress. In other words, the carrier has a higher natural frequency in the bending mode than in the torsion mode.

In one embodiment, the inner beam has a pair of upper flanges, a pair of lower flanges and a pair of intermediate flanges connected to the upper and lower flanges by respective ribs. Alternatively, the inner beam may have a gourd-shaped section. Still alternatively, the inner beam may have a T-shaped, inverted T-shaped, C-shaped or inverted C-shaped section.

BRIEF DESCRIPTION OF THE DRAWINGS

The above and other objects, features and advantages will become apparent from a consideration of the following description of preferred embodiments when taken in conjunction with the accompanying drawings, in which.

DETAILED DESCRIPTION OF THE INVENTION

Figure 1:
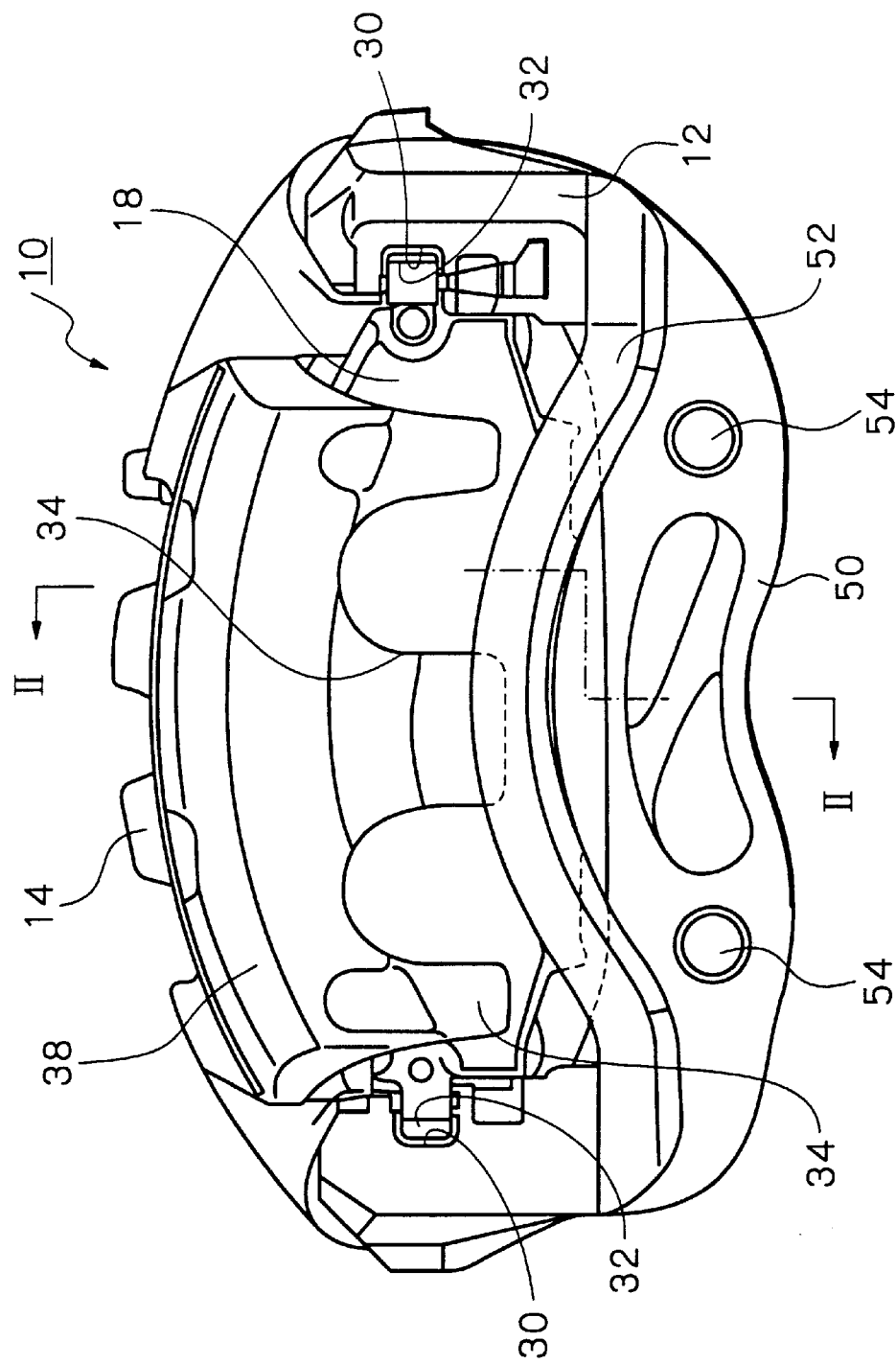
FIG. 1 is a front view of a disc brake assembled according to one embodiment of the present invention.
Figure 2:
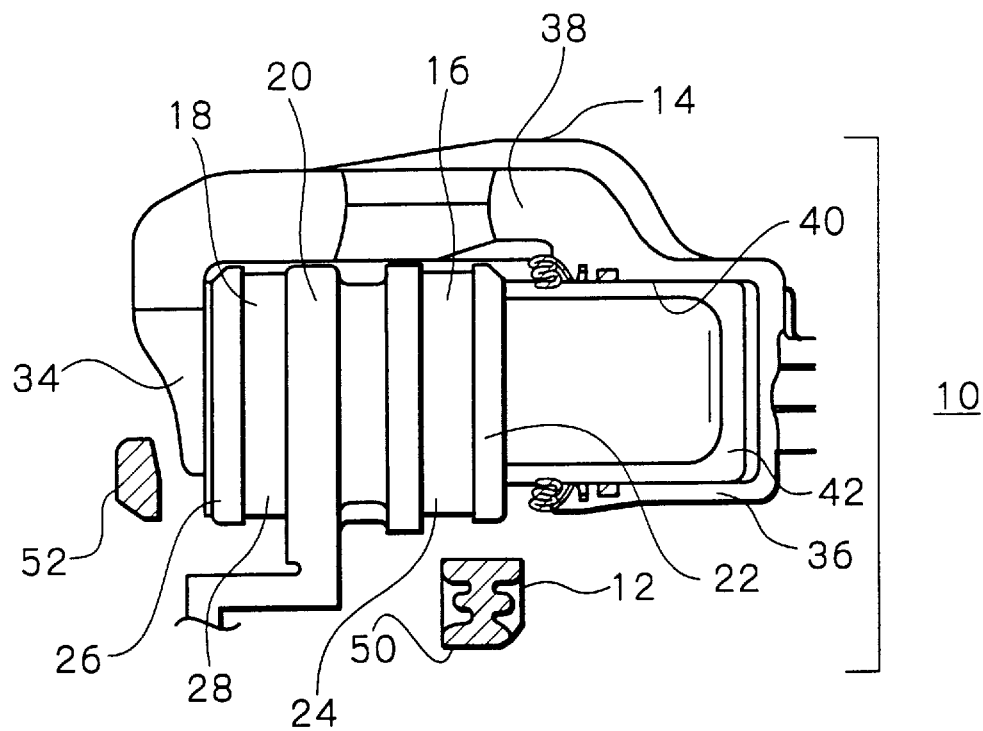
FIG. 2 is a sectional view taken on line II—II in FIG. 1.

Referring now to FIGS. 1 and 2, there is illustrated a floating caliper type disc brake assembled according to one embodiment of the present invention and generally designated at 10. The disc brake 10 includes a carrier 12 secured to a fixed part of a vehicle (not shown), and a caliper 14 slideably supported on the carrier 12 through a pin mechanism (not shown). An in board brake pad assembly 16 and an outboard brake pad assembly 18 are positioned on opposite sides of a rotor or disc 20 which is rotatable with a wheel (not shown) to be braked. The in board brake pad assembly 16 is composed of a planar backing plate 22 and a friction pad 24 secured to one side of the backing plate 22 and positioned to engage one side of the rotor 20 for braking action. Similarly, the outboard brake pad assembly 18 is composed of a planar backing plate 26 and a friction pad 28 secured to one side of the backing plate 26 and positioned to engage the other, outboard side of the rotor 20. The in board brake pad assembly 16 and the outboard brake pad assembly 18 are slideably supported on the carrier 12. The carrier 12 is formed with a pair of opposite guide recesses 30, 30 configured to receive a corresponding pair of pad guides 32, 32. The pad guides 32, 32 are adapted to promote sliding movement of the in board and outboard brake pad assemblies 16, 18 along the axis of the rotor 20.

The caliper 14 is of a floating type and has a front or outboard leg 34, a rear or in board leg 36 and a bridge 38 extending over the periphery of the rotor 20 to interconnect the in board and outboard legs 34, 36. The in board caliper leg 36 contains an actuator cylinder 40 within which a piston 42 is slideably received. The caliper 14 serves to apply the necessary clamping force to the in board and outboard brake pad assemblies 16, 18. Specifically, when a brake pedal (not shown) is depressed, hydraulic fluid is forced into the cylinder 40 to thereby cause the in board friction pad 24 to be urged into frictional engagement with the in board side of the rotor 20. The caliper 14 is then slid axially on the pin mechanism so as to apply an inwardly directed force to the outboard brake pad assembly 18. This force causes frictional engagement of the outboard friction pad 28 with the outboard side of the rotor 20.

Figure 3:
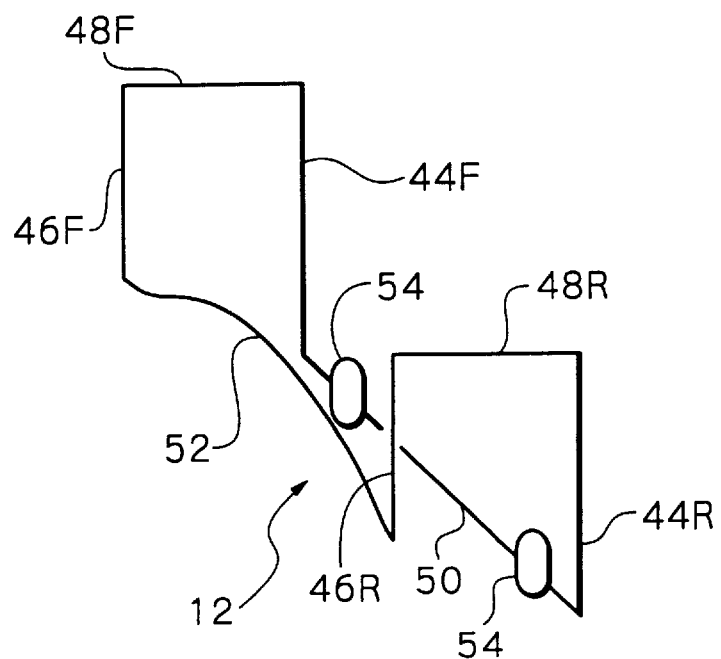
FIG. 3 is a schematic view of a carrier shown in FIG. 1.

As schematically shown in FIG. 3, the carrier 12 includes a pair of front and rear inner arms 44F, 44R located on the in board side of the rotor 20 in a circumferentially spaced relation, a pair of front and rear outer arms 46F, 46R located on the outboard side of the rotor 20 in a circumferentially spaced relation, a front arm bridge 48F extending over the periphery of the rotor 20 and adapted to connect the upper end of the front inner arm 44F and the upper end of the front outer arm 46F, a rear arm bridge 48R extending between the upper end of the rear inner arm 44R and the upper end of the rear outer arm 46R, an inner beam 50 extending between the lower end of the two inner arms 44F, 44R, and an arcuate outer beam 52 extending between the lower end of the two outer arms 46F, 46R. The carrier 12 is of a generally inverted U-shape when viewed from side. Two holes 54, 54 are formed in the inner beam 50. Two corresponding bolts (not shown) extend through the holes 54, 54 to secure the carrier 12 to a fixed part of the vehicle, for example, a knuckle.

Figure 4:
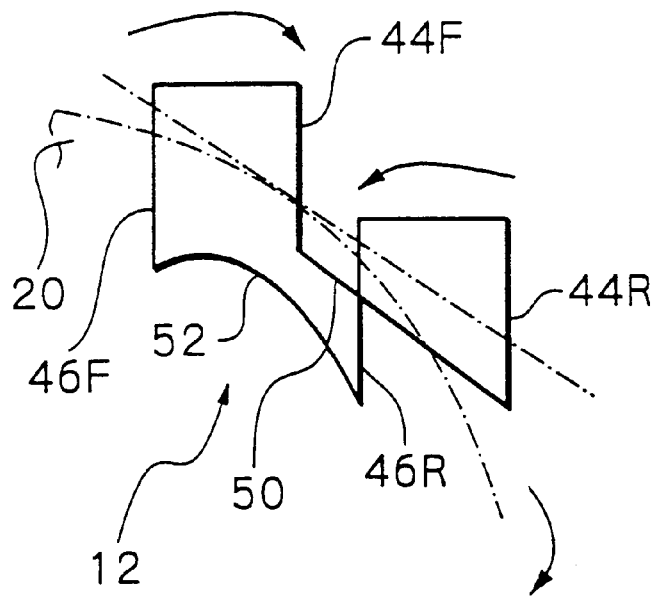
FIG. 4 shows the manner in which the carrier is twisted at a squeal occurrence.
Figure 5:
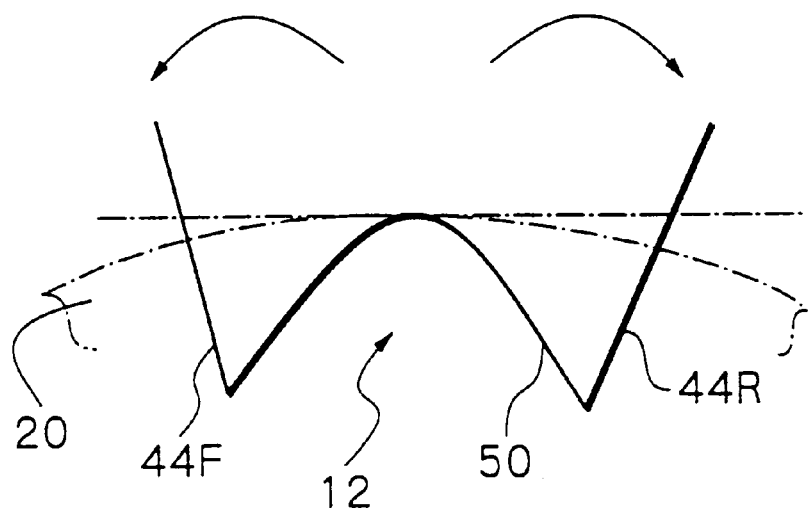
FIG. 5 shows the manner in which the carrier is bent at a squeal occurrence.

When a brake pedal is depressed, all braking friction torque is transferred to the inner and outer arms. At this time, the front and rear inner arms 44F, 44R are twisted or rotated in opposite directions, as shown by the arrow in FIG. 4, about the longitudinal axis of the vehicle as shown by broken line in FIG. 4. This is also the case with the front and rear outer arms 46F, 46R. At the same time, the inner and outer arms are oppositely bent away from each other or rotated about an axis which is parallel to the axis of the rotor and perpendicular to the longitudinal axis of the vehicle, as shown in FIG. 5. Through an extensive search, the inventor has found that these two different modes of vibration, that is, torsion mode and bending mode, interact to thereby cause a self-exited vibration.

Figure 6:
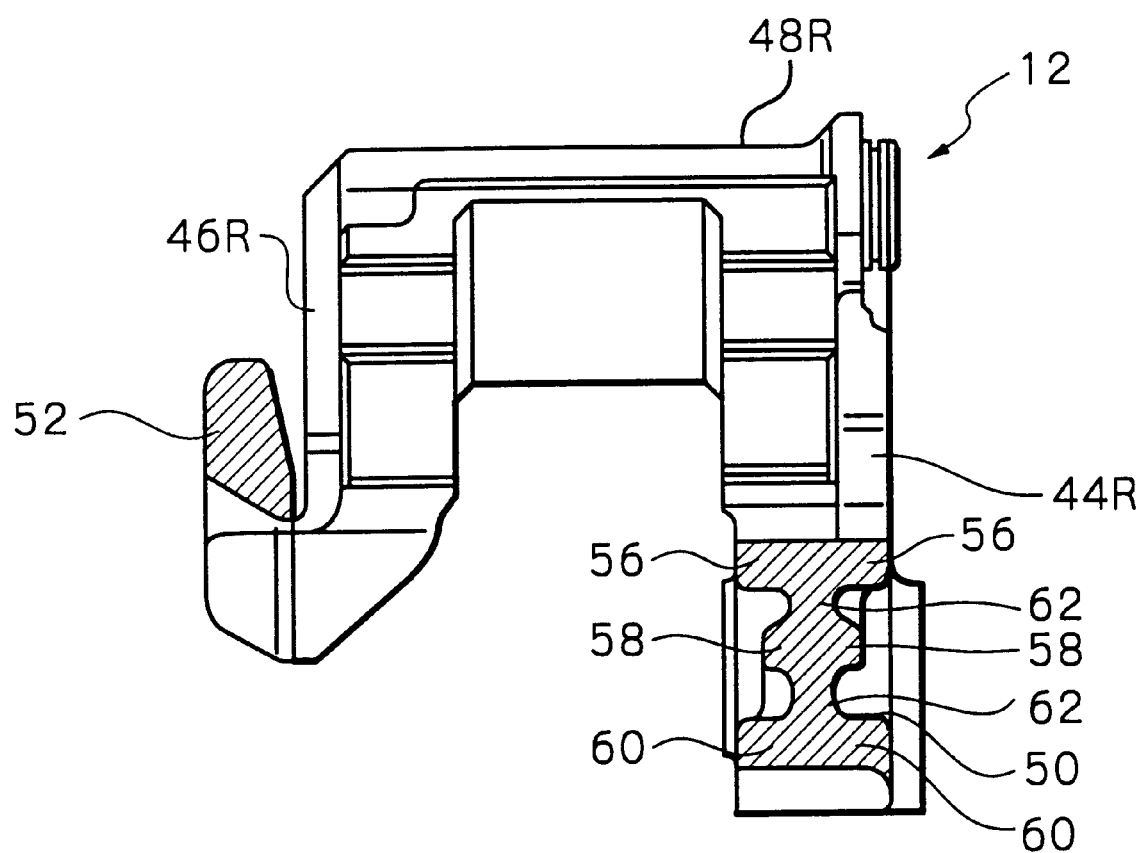
FIG. 6 is a side view of the carrier with an inner beam shown in section.

In order to eliminate such a self-exited vibration and thus, substantially reduce the number of occurrences of a low frequency noise or squeal during brake actuation, the carrier 12 of the present invention is constructed such that a moment of inertia of area/polar moment of inertia of area ratio is at least 0.75. As shown in FIG. 6, the inner beam 50 of the carrier 12 has three pairs of flanges 56, 58, 60 interconnected by ribs 62, 62. The upper and lower pairs of flanges 56, 60 are larger than the intermediate pair of flanges 58. This design allows the moment of inertia of area/polar moment of inertia of area ratio to be greater than that (0.57) in a typical carrier known in the art (see FIG. 14,) where its inner beam has a generally rectangular cross section. The carrier 12 of the present invention is twisted as much as the known carrier, but bent less than the known carrier.

Figure 7:
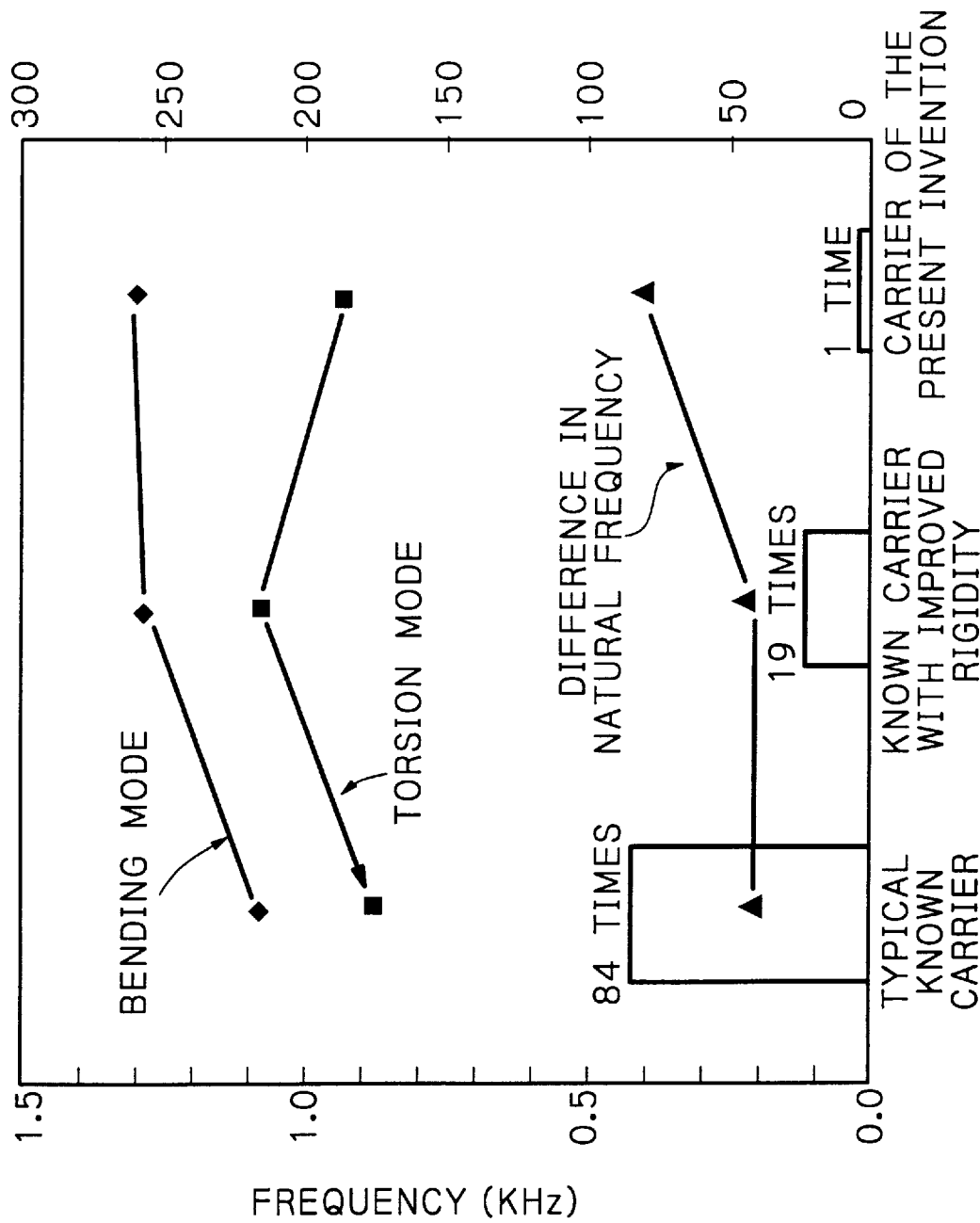
FIG. 7 is a graph showing the relationship between the difference in natural frequency when the carrier is bent and when the carrier is twisted, and the number of occurrences of a low frequency noise.
Figure 14:
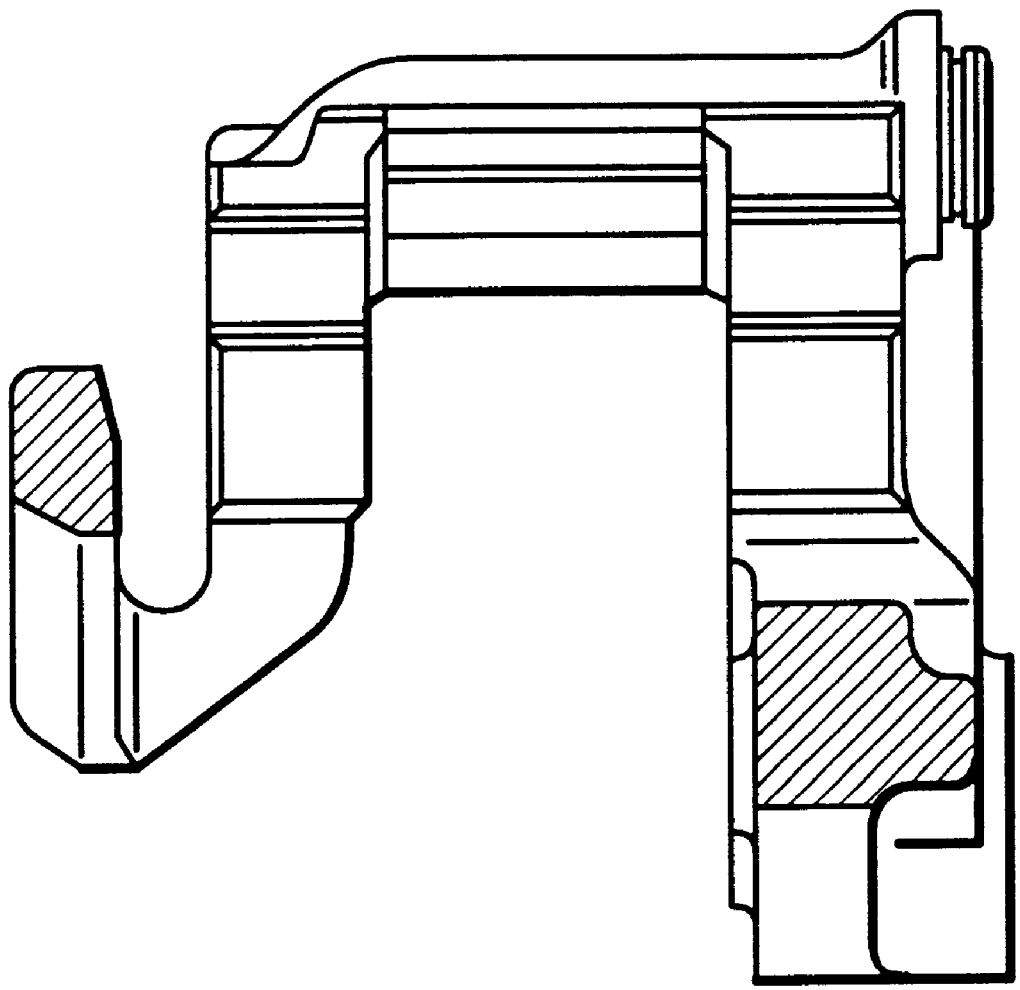
FIG. 14 is a side view of a known carrier with an inner beam shown in section.

Referring specifically to FIG. 7 (Note: the following tests were carried out under various conditions, with carriers in an unconstrained mode), the carrier shown in FIG. 14 has a natural frequency of 869 Hz in a torsion mode, and a natural frequency of 1074 Hz in a bending mode. The difference in frequency between the bending and torsion modes is roughly 200 Hz. This known carrier made low frequency noise 84 times. Another known carrier with improved rigidity has a natural frequency of 1094 Hz in the torsion mode, and a natural frequency of 1285 Hz in the bending mode. The difference in frequency is approximately 190 Hz. The improved carrier still made low frequency noise 19 times. It has been found that an improvement in rigidity does not contribute to a reduction in the number of occurrences of a low frequency noise during brake actuation.

The carrier 12 according to the present invention has a natural frequency of 906 Hz in the torsion mode and a natural frequency of 1299 Hz in the bending mode. The difference in natural frequency is more than 300 Hz. In this design, the number of occurrences of a low frequency noise is substantially reduced. In fact, squeal occurred only once during a number of tests. It is believed that interaction between the bending and torsion modes of vibration hardly occurs when the difference in natural frequency is more than 300 Hz.

Figure 8:
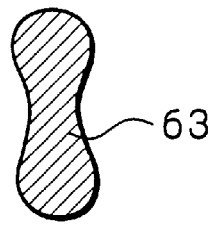
FIGS. 8, 9, 10, 11, 12 and 13 are sectional views showing a variety of modified forms of the inner beam.
Figure 13:
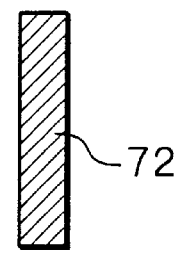
Figure 9:
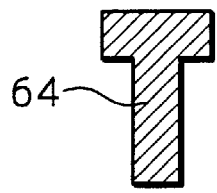
Figure 10:
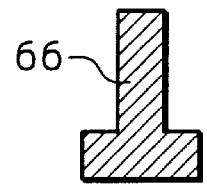
Figure 11:
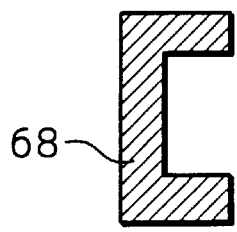
Figure 12:
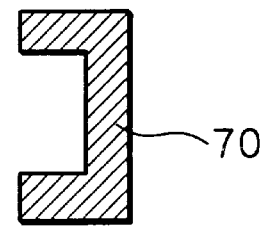

FIGS. 8 to 13 illustrate modified forms of the inner beam. More specifically, an inner beam 63 may have a gourd-like section as shown in FIG. 8. Alternatively, an inner beam 64 may have a T-shaped section as shown in FIG. 9 or an inner beam 66 may have an inverted T-shaped section as shown in FIG. 10. Still alternatively, an inner beam 68 may have a C-shaped section as shown in FIG. 11 or an inner beam 70 may have an inverted C-shaped section as shown in FIG. 12. As shown in FIG. 13, an inner beam 72 may be elongated in the height direction of a vehicle. In any case, the carrier has a moment of inertia of area/polar moment of inertia of area ratio of at least 0.75 so as to minimize the number of occurrences of the low frequency noise during brake actuation.

In the foregoing embodiments, the inner beam has a section different from that of known inner beams. However, any other part of the carrier may have a different section so far as the difference in natural frequency between that part in the torsion and bending modes is no lower than 300 Hz.

In the illustrated embodiments, the carrier has a natural frequency in a bending mode greater than a natural frequency in a torsion mode. Alternatively, the carrier may have a natural frequency in a torsion mode greater than a natural frequency in a bending mode so far as the difference between the two modes is at least 300 Hz.

Although the present invention has been described with respect to its preferred embodiment, it is to be understood that various modifications and changes may be made without departing from the spirit and scope of the invention as defined by the appended claims.

What is claimed is:

1. A disc brake, comprising:

an inboard brake pad assembly and an outboard brake pad assembly each to be located on a respective opposite side of a rotor that has an axis and an outer periphery;

a caliper to extend over the outer periphery of the rotor and to be movable along the axis thereof, such that said inboard brake pad assembly and said outboard brake pad assembly are each movable into frictional engagement with its respective opposite side of the rotor; and a carrier slidably supporting said inboard brake pad assembly and said outboard brake pad assembly, wherein said carrier has a first natural frequency in a bending mode and a second natural frequency in a torsion mode and includes an inner beam to be secured to a part of a vehicle and an outer beam connected to said inner beam and spaced therefrom along the axis of the rotor, with said inner beam having a sectional shape such that the difference between the first natural frequency and the second natural frequency is at least 300 Hz.

2. The disc brake according to claim 1, wherein said inner beam has a moment of inertia of area in the bending mode and a polar moment of inertia of area in the torsion mode, with the ratio of the moment of inertia of area to the polar moment of inertia of area being at least 0.75.

3. The disc brake according to claim 2, wherein said sectional shape of said inner beam is defined by a pair of upper flanges, a pair of lower flanges, and a pair of intermediate flanges connected to said pairs of upper and lower flanges by respective ribs.

4. The disc brake according to claim 2, wherein said sectional shape includes a gourd shape.

5. The disc brake according to claim 2, wherein said sectional shape includes a T shape.

6. The disc brake according to claim 2, wherein said sectional shape includes an inverted T shape.

7. The disc brake according to claim 2, wherein said sectional shape includes a C shape.

8. The disc brake according to claim 2, wherein said sectional shape includes an inverted C shape.

9. The disc brake according to claim 2, wherein said sectional shape is defined by a rectangular shape having its longer sides oriented generally orthogonally to the axis of the rotor.

10. The disc brake according to claim 1, wherein said sectional shape of said inner beam is defined by a pair of upper flanges, a pair of lower flanges, and a pair of intermediate flanges connected to said pair of upper and lower flanges by respective ribs.

11. The disc brake according to claim 1, wherein said sectional shape includes a gourd shape.

12. The disc brake according to claim 1, wherein said sectional shape includes a T shape.

13. The disc brake according to claim 1, wherein said sectional shape includes an inverted T shape.

14. The disc brake according to claim 1, wherein said sectional shape includes a C shape.

15. The disc brake according to claim 1, wherein said sectional shape includes a inverted C shape.

16. The disc brake according to claim 1, wherein said sectional shape is defined by a rectangular shape having its longer sides oriented generally orthogonally to the axis of the rotor.

* * * * *